Jan. 27, 1970   J. S. GALLO   3,491,445
PERFORATING TOOL WITH PERFORATING MEANS
MOUNTED ON OPPOSED WHEELS ON THE
ENDS OF PIVOTED HANDLES
Filed April 3, 1967
FIG. 1
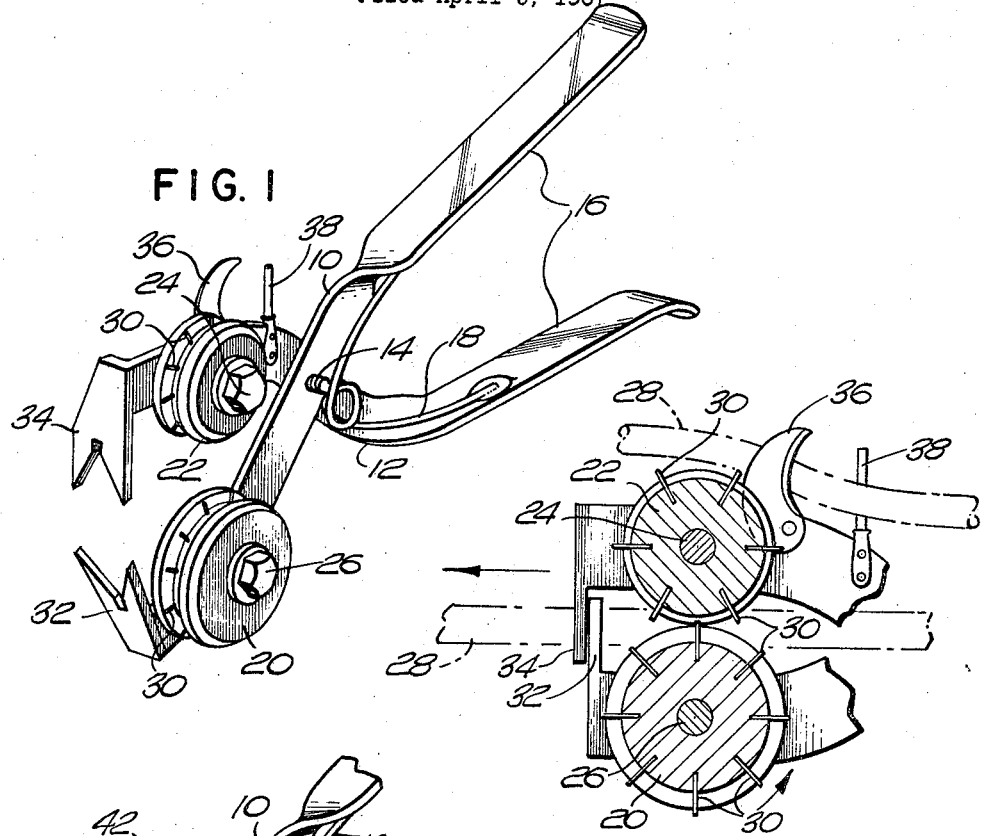
FIG. 2
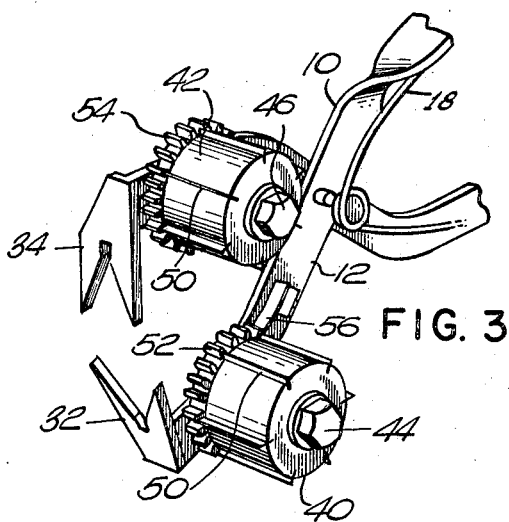
FIG. 3
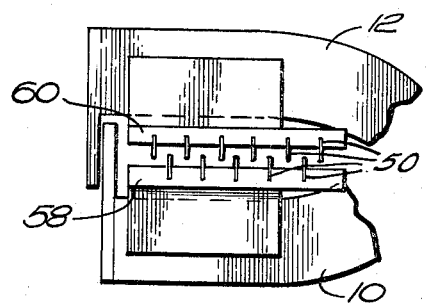
FIG. 4
INVENTOR.
BY Joseph S. Gallo
ATTORNEY

United States Patent Office 3,491,445
Patented Jan. 27, 1970

3,491,445
PERFORATING TOOL WITH PERFORATING
MEANS MOUNTED ON OPPOSED WHEELS
ON THE ENDS OF PIVOTED HANDLES
Joseph Sabeto Gallo, 58 Peach St.,
Walpole, Mass. 02081
Filed Apr. 3, 1967, Ser. No. 627,729
Int. Cl. B26f 1/00
U.S. Cl. 30—359                                    2 Claims

ABSTRACT OF THE DISCLOSURE

The disclosure of the invention comprises a tool for preparing cut flower stems to take up water, having a pair of manually operable handles connected to be squeezed together, and flower stem bark perforating elements connected with said handles to be moved against opposite sides of a cut flower stem. The perforating elements may be wheels, each having a series of radially disposed perforating pins differently spaced so that the perforations on opposite sides of the stem will be staggered. In a modification the perforating elements are drums having peripherally located transverse knife edges of a depth to form discontinuous cuts through the bark into the adjacent water carrying cells. In a further modification the perforating elements are flat plates, each having a series of transverse knife edges. The tool is provided further with a pair of strippers and a stem severing knife and stem positioning post.

---

The present invention relates to a tool for preparing cut flowers to take up water.

It is well known that cut flowers will absorb water through the lower ends of their stems. The water is drawn upwardly along channels which exist between the outside shell or bark of the plant and the relatively dense pulpy interior portion thereof. Cut flowers are frequently freshened, in order to prolong the life of the bloom, by trimming or shortening the stem, preferably on a diagonal, which has the effect of starting afresh the natural process within the plant stem of drawing water upwardly through the cells existing between the bark and the more solid interior portion of the stem. Under certain circumstances, however, as for example, when the cut flower is mounted in a water filled pic, there will normally be no opportunity for further cutting. Since the cut flower mounted in a pic may be placed in almost any position, which may be horizontal instead of the conventional vertical position, there is the likelihood that the cut end of the stem may be entirely out of water, with the result that early fading or wilting of the bloom may take place.

It is a principal object of the invention to provide a tool for conditioning the stems of cut flowers to take up water which will substantially enhance the ability of the cut flower stem to pick up water from the supply in which it is immersed, and thereby substantially prolong the useful life of the bloom.

Other objects of the invention are to provide a tool of this description, having provision for the performance of additional stem trimming and cutting off operations in order to completely condition the cut flower for use.

With these and other objects in view as may hereinafter appear, a feature of the invention consists in the provision of a tool constructed and arranged to make a series of perforations through the bark of the stem communicating with the immediately adjacent water transmitting cells through which water is drawn upwardly into the leafy and flowering extremities of the plant, said perforations being disposed along that portion of the stem to be immersed in water.

The several features of the invention together with the advantages to be obtained thereby will be readily appreciated by one skilled in the art from the following description taken in connection with the accompanying drawing, in which:

FIG. 1 is a perspective view of a cut flower preparing tool embodying the several features of the invention;

FIG. 2 is a sectional view in side elevation of a portion of the tool shown in FIG. 1 illustrating on a larger scale the wheels having bark perforating pins mounted thereon, a stem trimmer and a stem cut-off knife;

FIG. 3 is a partial view in perspective of a modified form of flower preparing tool, in which the bark perforating elements are drums with transverse knife edges and gears arranged to be engaged as the jaws of the tool are closed upon a cut flower stem; and FIG. 4 is a fragmentary view of a modified form of the cut flower preparing tool in side elevation, in which the bark perforating elements are two flat plates formed with transverse knife edges arranged to form staggered transverse cuts in opposite sides of a cut flower stem.

A preferred embodiment of my cut flower preparing tool as shown in FIGS. 1 and 2 of the drawing comprises a pair of scissor-like elements 10, 12 connected intermediate their lengths by a pivot 14, with handles 16 which are normally biased apart by a U-shaped spring member 18. Two wheels 20, 22 are mounted respectively on the ends of the scissor elements 10, 12 on parallel pivots 24, 26. The peripheral surface of wheel 20 is deeply concaved to receive a flower stem 28. The peripheral surface of wheel 22, shown as slightly concaved, may be flat or even slightly convex to ensure that the flower stem, regardless of size, will be firmly pressed between the wheels. Each wheel 20 and 22 is provided with a series of pins 30 which extend radially outward from the peripheral surface at spaced intervals about the wheel. The pins 30 on wheel 20 are preferably spaced further apart than the pins on wheel 22, so that the perforations made by the pins on the two wheels will not be opposite one another, thereby preventing any tendency of these perforations to weaken the stem.

As shown in FIGS. 1 and 2, two oppositely notched stripper elements 32, 34 are mounted on the outer ends of scissor elements 10, 12 in position to be brought together when the handles 16 are squeezed. The stripper elements 32, 34 are engaged against opposite sides of a flower stem 28 and are drawn lengthwise of the stem to strip off any unwanted branches, leaves, or the like.

The tool shown in FIGS. 1 and 2 is further provided with a stem severing knife blade 36 which is secured to the scissor element 12, and a positioning post 38 which extends outwardly from the scissor element parallel to the knife. When the tool is placed with the knife blade 36 against the stem 28 of a cut flower and with an adjacent portion of the stem bent backwardly around the positioning post 38, a pull exerted on the tool will cause the knife blade 3 to cut diagonally through the stem severing the unwanted end portion therefrom.

In operation the stem of a cut flower to be treated is placed between the two wheels 20 and 22 which are then pressed toward one another by manual compresssion of the handles 16, and the stem is then pulled out from between the wheels. In this manner two series of small perforations are made in opposite sides of the stem staggered from one another as above described.

In another embodiment of the invention illustrated in FIG. 3 two drums 40 and 42 are mounted on bearing pins 44, 46 on the free arms of the scissor elements 10 and 12 in parallel relation so that the stem 28 of a cut flower can be placed between and pressed by the two drums against the pressure of the U-shaped spring 18 mounted between the handles. Each drum has formed on the periphery thereof a series of transverse knives 50. The knives on one drum are preferably spaced at wider intervals than the knives on the other drum, so that the transverse cuts made by the knives on one drum will surely not be losated directly opposite the cuts on the opposite side of the stem made by the knives on the other drum, to avoid weakening the stem. The depth of the cuts is predetermined to extend barely through the bark so that the pulpy central portion of the stem is left virtually intact. Gears 52 and 54 mounted on the ends of drums 40 and 42 are arranged to be brought into mesh as the jaws of the tool are closed on a flower stem, causing the drums to be rotated in a predetermined angular relation as the flower stem is pulled between the drums. Spring detents 56, of which only one is shown, on the scissor arms for engagement with the respective gears 52 and 54 serve to keep the drums 40 and 42 so phased that the knife edgess 50 on the respective drums will always be in staggered relation to one another.

When the embodiment of FIG. 3 is employed it is preferred to provide two separate tools, one with relatively deeper knife edges for treating the stems of large plants such as stock, gladiolas, crysanthemums, dahlias and the like, the other with shallow knife edges for treating the stems of smaller plants which would include roses, carnations, iris, tulips, sweet peas, gerbra and the like. It will be understood that the embodiment of FIGS. 1 and 2 is well adapted for perforating the stems of cut flowers of any size, since the perforations made by pins 30 are not of sufficient size to substantially weaken the flower stem though the punctures may penetrate deeply into the pulpy central portion of the stem.

FIG. 4 of the drawing illustrates a further modification in which the cutting knife edges 50 of FIG. 3 are mounted on two opposed flat plates 58 and 60 carried on scissor elements 10 and 12. The depth of the knife edges 50 is predetermined to make transverse cuts in a interposed flower stem, which are just deep enough to penetrate the bark, allowing water to enter the adjacent water transmitting cells.

It will be understood that the invention is not limited to the particular embodiments shown, and that other embodiments of the invention are contemplated within the spirit and scope of the invention.

The invention having been described what is claimed is:

1. A tool for perforating the stems of cut flowers having, in combination, manually operable handles mounted to turn on a pivot intermediate the length of said handles and providing support members at one side of said pivot, spring means biasing said handles to move said support members apart, a pair of wheels mounted on said support members to turn on parallel axes in opposed relation to one another, the peripheral surface of at least one of said wheels being concaved to receive a cut flower stem, and a series of radially projecting stem perforating elements on each of said wheels located at different spaced intervals about the peripheries of the respective wheels to stagger the perforations made on opposite sides of the stem, and of a depth to form perforations in the stem extending through the bark into the adjacent water carrying cells of the stem.

2. A tool for perforating the stems of cut flowers to take up water according to claim 1, in which the peripheral surfaces of both of said wheels are concaved, and the stem perforating elements are pins of a length to project through the bark into the adjacent water carrying cells of the stems.

References Cited

UNITED STATES PATENTS

| 124,046 | 2/1872 | Franklin | 30—365 X |
| 385,897 | 7/1888 | Yates | 30—364 |
| 434,496 | 8/1890 | Austin | 30—364 |
| 661,896 | 11/1900 | Shands | 30—364 |
| 699,584 | 5/1902 | Smith | 30—319 |
| 1,391,890 | 9/1921 | Green | 30—364 |
| 1,528,615 | 3/1925 | Janecek | 30—365 X |
| 1,645,385 | 10/1927 | Kaplan | 30—365 |
| 1,848,021 | 3/1932 | Miller | 30—364 |
| 2,848,841 | 8/1958 | Kuts | 47—1 |
| 3,279,066 | 10/1966 | Senour | 30—358 |

FOREIGN PATENTS

| 431,513 | 11/1911 | France. |
| 289,648 | 1/1916 | Germany. |

ROBERT C. RIORDON, Primary Examiner

J. C. PETERS, Assistant Examiner

U.S. Cl. X.R.

30—363, 365, 368